June 11, 1957 D. C. EVANS 2,795,696

FLIP-FLOP CIRCUIT

Filed July 7, 1953 2 Sheets-Sheet 1

INVENTOR.
DAVID C. EVANS
BY
Ellsworth R. Roston
ATTORNEY

| | OPERATION OF TUBE 28 | VOLTAGE ON LEAD 42 | VOLTAGE ON LEAD 50 |
|---|---|---|---|
| PULSE FROM SOURCE 10 | PRODUCES OSCILLATORY SIGNALS | 0 VOLTS | -20 VOLTS |
| PULSE FROM SOURCE 60 | DOES NOT PRODUCE OSCILLATORY SIGNALS | -20 VOLTS | 0 VOLTS |

INVENTOR.
DAVID C. EVANS
BY
Ellsworth R. Roston
ATTORNEY

United States Patent Office 2,795,696

Patented June 11, 1957

2,795,696

FLIP-FLOP CIRCUIT

David C. Evans, Los Angeles, Calif., assignor to Bendix Aviation Corporation, Detroit, Mich., a corporation of Delaware Application July 7, 1953, Serial No. 366,515

14 Claims. (Cl. 250—27)

This invention relates to flip-flop units and more particularly to flip-flop units which are considerably simplified over those now in use.

The flip-flop units now in use are generally based on the original Eccles-Jordan circuit. Such units utilize a pair of tubes and interconnect the plate of each tube to the grid of the other tube by a network of resistances and capacitances. Thus, when one tube becomes cut off upon the introduction of a triggering signal, the resultant increase in voltage on the plate of the tube is transferred to the grid of the other tube to produce a flow of current through the tube. In this way, one of the tubes is conductive at any instant and the other tube is cut off.

The flip-flop circuits now in use have certain disadvantages. In order to have the proper interdependence in the operation of the two tubes, the resistances and capacitances coupling the tubes must have precise values. This causes the cost of the flip-flop units to be relatively high. Furthermore, the grid of each tube in the Eccles-Jordan circuit must receive its triggering signals through a separate input stage and the output from each tube generally has to be introduced through a separate output stage, such as a cathode follower circuit.

Since input and output stages are required, at least three tubes are generally used even when double triodes are specified. The use of a large number of tubes in turn causes each flip-flop unit to be relatively complex and bulky and to be relatively inefficient in operation. Such considerations are especially important in the field of electronic computers, where a hundred or more flip-flop units may be utilized in a single computer to perform different functions. Because of the disadvantages of the flip-flop units now in use, many attempts have been made to develop new flip-flop circuits but none of the attempts have been entirely successful.

This invention provides a new flip-flop circuit which overcomes the above disadvantages. The invention includes a tube which functions in an oscillator stage to produce signals only upon the introduction of a triggering signal. A pair of rectifier circuits are associated with the oscillator to respectively produce low and high voltages during periods of non-oscillation and high and low voltages upon the commencement of oscillations. By coupling the output from the circuits through a gate circuit to the oscillator tube, oscillations are maintained until the introduction of a second signal from an external source. In this way, a high voltage is maintained on the first circuit and a low voltage is maintained on the second circuit until the introduction of the second triggering signal.

An object of this invention is to provide a flip-flop circuit which utilizes a minimum number of tubes and other components.

Another object is to provide a flip-flop circuit of the above character which is relatively inexpensive to manufacture because of its minimum number of components and because of its elimination of any precision components such as resistances.

A further object is to provide a flip-flop circuit of the above character which produces increased power outputs relative to the flip-flop circuits now in use.

Still another object is to provide a flip-flop circuit of the above character which utilizes an oscillator stage and rectifier and gate circuits in conjunction with the oscillator to produce a pair of output voltages of a first relationship during periods of non-oscillation and a pair of output voltages of an opposite relationship during periods of oscillation.

A still further object is to provide a flip-flop circuit of the above character which obtains a considerable stability in operation by producing a slight flow of current through the oscillator tube even during the time that oscillatory signals are not being produced.

Other objects and advantages will be apparent from a detailed description of the invention and from the appended drawings and claims.

Figure 1:
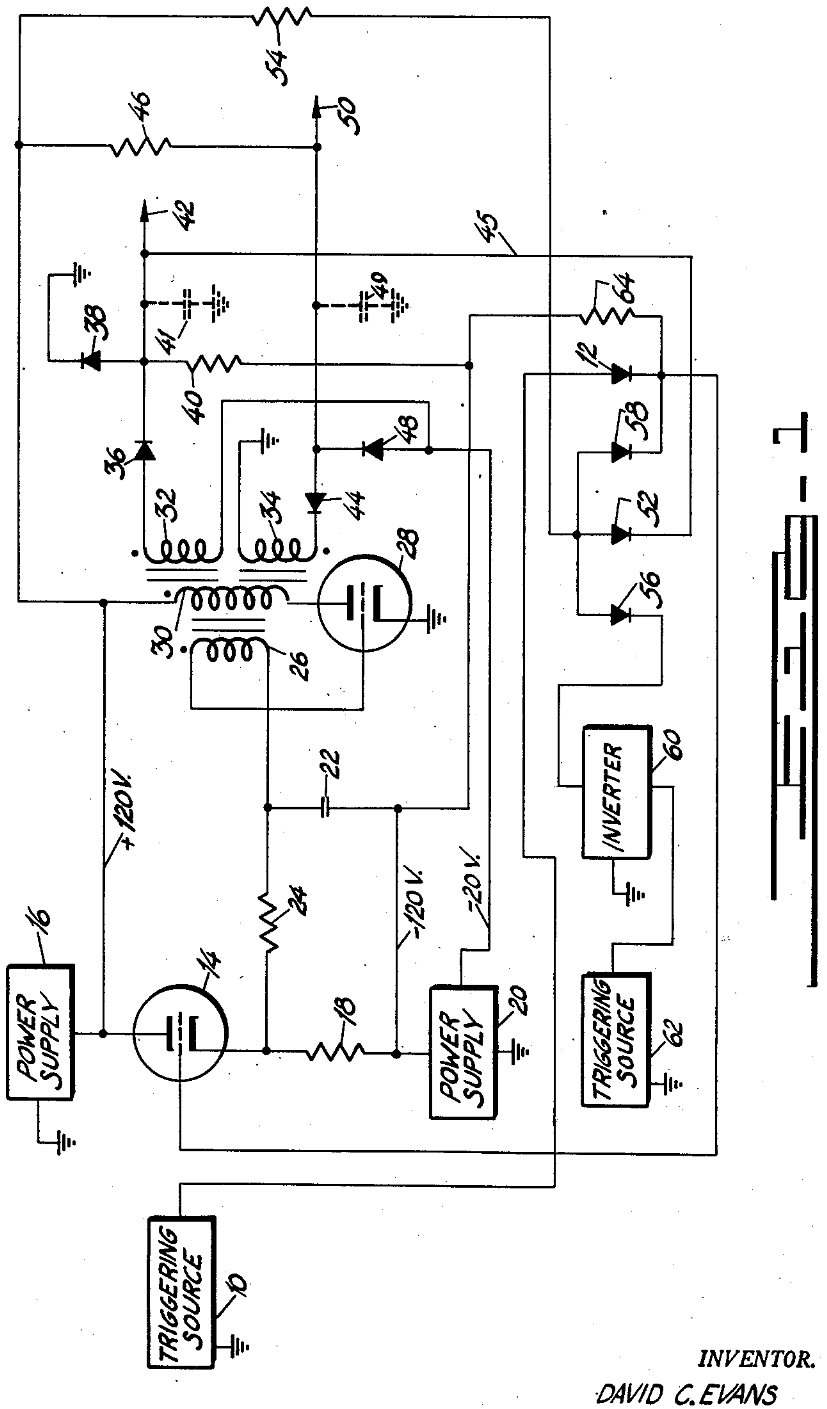
Figure 1 is a circuit diagram of one embodiment of the invention.

In one embodiment of the invention, a source 10 of triggering signals is connected to the plate of a diode 12, the cathode of which is connected to the grid of a tube 14. The plate of the tube 14 has a positive voltage such as +120 volts applied to it from a suitable power supply 16. A resistance 18 is in series with the cathode of the tube 14 and with a suitable power supply such as a battery 20. The battery 20 is adapted to supply a suitable negative voltage such as −120 volts.

A capacitance 22 and a resistance 24 are in series with each other and in parallel with the resistance 18. The common terminal between the capacitance 22 and the resistance 24 is connected to one terminal of a winding 26, the other terminal of which is connected to the grid of a tube 28. The cathode of the tube 28 is grounded, and the plate has voltage applied to it through a winding 30 in series with the power supply 16.

The windings 26 and 30 are magnetically coupled to each other and to a pair of windings 32 and 34. One end of the winding 32 is connected to a suitable terminal of the power supply 20 to produce a negative voltage such as −20 volts, and the other end of the winding is connected to the plate of a diode 36. Connections are made from the cathode of the diode 36 to the plate of a diode 38 having its cathode grounded and to a resistance 40 in series with the power supply 20. A capacitance indicated in broken lines at 41 is shown connected between the plate of the diode 38 and ground. This capacitance is formed from the distributed capacitance in the components associated with the winding 32. An output voltage is taken through a lead 42 from the plate of the diode 38.

One end of the winding 34 is grounded, and the other end is connected to the cathode of a diode 44. The plate of the diode 44 has a common terminal with a resistance 46 in series with the power supply 16 and also has a common terminal with the cathode of a diode 48, the plate of which receives approximately −20 volts from the power supply 20. A distributed capacitance 49 corresponding to the capacitance 41 is shown connected between the cathode of the diode 48 and ground. An output voltage is taken through a lead 50 from the cathode of the diode 48.

In addition to being connected to the resistance 40 and to the cathode of the diode 36, the plate of the diode 38 is also connected to the cathode of a diode 52. Connections are made from the plate of the diode 52 to a resistance 54 in series with the power supply 16 and to the plates of diodes 56 and 58. The cathode of the diode 56 receives signals through an inverter 60 from a source 62 of triggering signals. The cathode of the diode 58 has a common terminal with the cathode of the diode 12 and with a resistance 64. The resistance 64 has a potential of approximately −120 volts applied to it from the power supply 20.

The signals produced by the source 10 are introduced to the plate of the diode 12. These signals are preferably of a positive polarity and are illustrated at 70 in Figure 3. As will be disclosed in detail hereafter, the cathode of the diode 12 has at times a potential of approximately 0 volts and at other times a potential of approximately −20 volts. Since in either case the voltage on the cathode of the diode 12 is lower than the voltage on the plate of the diode when a signal is produced by the source 10, the signal from the source 10 passes through the diode 12 to the grid of the normally conductive tube 14.

When a triggering signal from the source 10 is introduced to the grid of the tube 14, it produces an increase in the current flowing through the tube 14 and the resistance 18. Since the tube 14 and the resistance 18 form part of a cathode follower circuit, a voltage pulse is produced across the resistance 18 corresponding to the signal introduced to the grid of the tube 14. This pulse of voltage is introduced through the winding 26 to the grid of the tube 28, which is included in an oscillator circuit.

The tube 28 may be biased with a sufficiently positive voltage to conduct a slight current under normal circumstances but to prevent the formation of oscillatory signals by the oscillator. Upon the introduction of the voltage pulse from the cathode of the tube 14, the tube 28 becomes fully conductive. This causes a current pulse to flow through a circuit including a power supply 16, the winding 30 and the tube 28.

The pulse of current flowing through the winding 30 and the tube 28 causes a pulse of magnetic flux to be produced in the winding 30. This flux links the winding 26 and causes a voltage pulse to be induced in the winding 26. The voltage pulse induced in the winding 26 is introduced to the grid of the tube 28 to produce a current pulse through the winding 30 and the tube 28. As a result of this regenerative action, the tube 28 and the windings 26 and 30 operate as an oscillator to produce recurrent signals.

During the time that the oscillator disclosed above is not producing recurrent signals, the output lead 42 has a negative potential of approximately −20 volts. This results from the flow of current through a circuit including the power supply 20, the resistance 40 and the distributed capacitance 41. Because of this current flow, the capacitance is charged to a negative potential. A potential of −20 volts is also produced at the terminal 42 because of the flow of current through a circuit including the power supply 20, the winding 32 and the diode 36 in case the potential on the lead 42 becomes more negative than −20 volts.

At the same time that a potential of approximately −20 volts is being produced on the lead 42, the output lead 50 has a potential of approximately 0 volts because of the flow of current through a circuit including the power supply 16, the resistance 46, the diode 44 and the winding 34. The output terminal 50 is at approximately 0 volts during this time since a negligible voltage drop is produced across the diode 44 and the winding 34.

The magnetic flux produced in the winding 30 upon the flow of current through the winding causes voltages to be induced in the windings 32 and 34. The voltages induced in the windings 32 and 34 are cyclic because of the operation of the oscillator formed by the tube 28 and the windings 26 and 30. During the portion of each voltage cycle in which the upper terminal of the winding 32 is at a higher potential than the terminal 42, current flows through a circuit including the winding, the diode 36 and the distributed capacitance 41.

The current flowing through the distributed capacitance 41 causes the negative charge previously produced across the capacitance to be neutralized. The resultant potential across the capacitance 41 becomes approximately 0 volts since any tendency for the voltage on the lead 42 to rise above 0 volts is prevented by the clamping action of the diode 38. In this way, the potential on the output lead 42 rises from −20 volts to 0 volts when the tube 28 becomes fully conductive. The change in voltage on the lead 42 is shown in the chart constituting Figure 2.

Because of the action of the diode 44, current is unable to flow through the winding 34 during the portion of each voltage cycle when the upper terminal of the winding has a more positive voltage than the lower terminal of the winding. However, when the lower terminal of the winding 34 has a more positive voltage than the upper terminal of the winding, current flows through a circuit including the power supply 20, the diode 48, the diode 44, and the winding 34. Current also flows through a circuit including the power supply 20, the diode 48 and the distributed capacitance 49 and charges the capacitance. Since a negligible potential drop is produced across the diode 48, the voltage on the output lead 50 becomes approximately −20 volts. In this way, the potential on the lead 50 changes from 0 volts to −20 volts when the tube 28 becomes fully conductive. This is illustrated in the chart shown in Figure 2.

The voltage on the output lead 42 is introduced to the cathode of the diode 52. Since the plate of the diode 52 is connected through the resistance 54 to the power supply 16, current flows through the power supply 16, the resistance 54, the diode 52, and the diode 38. Because of the negligible voltage drop across the diodes 52 and 38, the plate of the diode 52 has a potential of approximately 0 volts during the time that recurrent signals are flowing through the tube 28. This voltage also appears on the plate of the diode 58. It further appears on the cathode of the diode 58 as a result of a flow of current through a circuit including the power supply 16, the resistance 54, the diode 58, the resistance 64 and the power supply 20.

Since the voltage on the cathode of the diode 58 is introduced to the grid of the tube 14, the current normally flowing through the tube 14 is maintained. This causes a sufficient voltage to be produced on the cathode of the tube 14 for introduction to the grid of the tube 28 so that the oscillations produced by the tube and the windings 26 and 30 can be maintained. In this way, a potential of approximately 0 volts is retained on the output lead 42 is even after the triggering signal from the source 10 has disappeared. The voltage produced on the output lead 42 is indicated at 72 in Figure 3. During the time that a potential of approximately 0 volts is produced on the lead 42, a potential of approximately −20 volts is produced on the lead 50, as indicated at 74 in Figure 3.

Figures 2, 3:
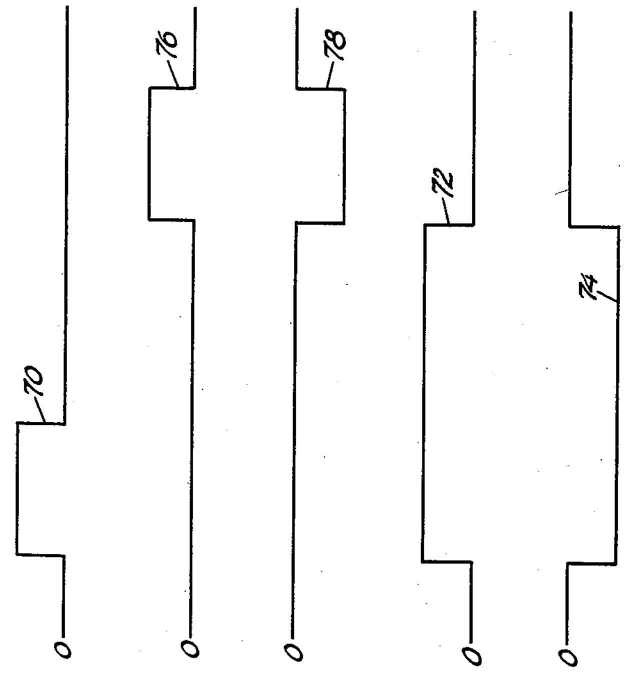
Figure 2 is a chart illustrating voltage relationships at strategic terminals in the circuit shown in Figure 1.
Figure 3 illustrates curves of the voltages at different terminals in the circuit shown in Figure 1.

When a triggering signal 76 is produced by the source 62, it is inverted by the inverter 60 to produce a negative signal indicated at 78 in Figure 3. This causes a negative voltage to appear on the cathode of the diode 56. This same negative potential also appears on the plate of the diode 56 because of the flow of current through a circuit including the power supply 16, the resistance 54, the diode 56 and components in the inverter 60. The negative voltage also appears at the plate of the diode 58 since the plates of the diodes 56 and 58 have a common terminal. It further appears on the cathode of the diode 58 because of the flow of current through a circuit which includes the power supply 16, the resistance 54, the diode 58, the resistance 64 and the power supply 20.

The negative voltage produced on the cathode of the diode 58 upon the introduction of a signal from the source 62 is applied to the grid of the tube 14 to cut off the tube. This causes the voltage on the cathode of the tube 14 to fall sufficiently to reduce the transconductance of tube 28 so that oscillations are terminated. Upon the termination of oscillations the voltage on the output lead 42 falls to a value of approximately −20 volts and the voltage at the terminal 50 rises to a potential of approximately 0 volts in a manner similar to that disclosed above.

As may be seen, the diodes 12, 52, 56 and 58 operate as a gate circuit to control the introduction of signals to the grid of the tube 14. In this way, the gate circuit operates to maintain the proper voltages on the output leads 42 and 50 during the period between the introduction of a signal from the source 10 and a signal from the source 62.

The operation of the gate circuit may be expressed by the logical equation:

$$A+B^1X$$

where "A" represents a positive voltage—in other words, a triggering signal—from the source 10; "$B^1$" represents a negative voltage—in other words, a triggering signal—from the inverter 60; and "X" represents a relatively high voltage—in other words, approximately "0" volts—on the lead 42. In the above equation, the "+" sign indicates that oscillations are maintained when either "A" is true or "$B^1X$" is true.

The flip-flop circuit disclosed above has several important advantages. It operates to provide a pair of output signals having a first voltage relationship to each other upon the introduction of a first triggering signal and having an opposite voltage relationship to each other upon the introduction of a second signal. These voltages are produced by the utilization of a minimum number of tubes. The voltages are also produced without any necessity of using such components as precision resistances, which are required in other flip-flop circuits.

Since only a minimum number of tubes are utilized and since the operation of the tubes is controlled in large part by diodes, a minimum amount of power is consumed in the circuit. This causes the efficiency in the operation of the circuit to be considerably higher than in flip-flop circuits now in use. Thus, for a given power input an increased power output is obtained over that provided by flip-flop circuits now in use.

As previously disclosed, the tube 28 may be biased with a sufficiently positive potential to produce a flow of current even during the time that recurrent signals are not produced. By producing a flow of current through the tube 28 at all times, a stability in the operation of the tube is maintained. This prevents any undesirable transients from being produced in the tube when the tube is triggered into its oscillatory state. If the tube 28 were cut off at all times, a relatively large impedance (known as "cathode interface impedance") might be built up in the tube upon cut-off of the tube. This impedance might vary considerably in accordance with the period of time that the tube remains cut off and with other considerations.

Since the tube 28 would not be triggered from its non-oscillatory to an oscillatory condition at constant intervals, the tube would present different impedances at different times and these impedances might affect the operation of the circuit. Thus, by maintaining the tube 28 conductive at all times, the flip-flop circuit disclosed above avoids problems which sometimes occur in Eccles-Jordan circuits where one of the two tubes in the circuit is always cut off.

Since the tube 28 operates in the circuit disclosed above in two states of conductivity, it may be considered in a broad sense to serve as a switch. The normally non-conductive operation of the tube 28 may be considered equivalent to an open state of a switch, and the conductive state of the tube 28 may be considered as equivalent to the closed state of the switch.

It should be appreciated that the tube 28 can be operated so that a triggering signal from the source 10 interrupts oscillations in the tube. The tube can be operated in this manner by connecting a resistance between the plate of the tube 14 and the power supply 16 and by introducing the voltage on the plate of the tube 14 of the grid of the tube 28. Since the voltage on the plate of the tube 14 would fall under such circumstances when a triggering signal is introduced to the tube from the source 10, this decrease in voltage would cause the tube 28 to become cut off. The tube 28 would then remain cut off until the production of a signal from the source 62.

Although this invention has been disclosed and illustrated with reference to particular applications, the principles involved are susceptible of numerous other applications which will be apparent to persons skilled in the art. The invention, therefore, is to be limited only as indicated by the scope of the appended claims.

What is claimed is:

1. In combination, an oscillator, means for normally biasing the oscillator to prevent oscillations, a first source for applying triggering signals to the oscillator to produce oscillations, circuit means coupled to the oscillator for producing a direct voltage of a first polarity during periods of non-oscillation in the oscillator and a direct voltage of an opposite polarity during periods of oscillation in the oscillator, a second source of triggering signals, and a network having diodes connected to the first and second sources and to the circuit means to produce a particular voltage upon the introduction of a triggering signal from the first source and until the introduction of a signal from the second source and having an output terminal connected to the oscillator to maintain oscillations during the production of the particular voltage by the network.

2. In combination, a tube, means for normally maintaining the tube in a first state of conductivity, a first source for applying a triggering signal to the tube to trigger the tube into a second state of conductivity, circuit means coupled to the tube to produce an output voltage having a first polarity during the periods of the first state of conductivity in the tube and an output voltage having an opposite polarity during periods of the second state of conductivity in the tube, a second source of triggering signals, and a gate circuit having input terminals connected to the first and second sources and to the circuit means to provide a particular voltage for maintaining the tube in its second state of conductivity during the period between the introduction of signals from the first and second sources and having an output terminal connected to the tube to maintain the tube in its second state of conductivity during the production of the particular voltage by the gate circuit.

3. In combination, an oscillator, means for normally biasing the oscillator to prevent oscillations, a transformer having a primary winding and a pair of secondary windings, the primary winding being connected to the oscillator, a first source for introducing a triggering signal to the oscillator to produce oscillations, a first circuit including a diode connected to one of the secondary windings to provide for the production of a voltage of a first polarity during periods of oscillation in the oscillator and for the production of a voltage of a second polarity during periods of non-oscillation in the oscillator, a second circuit including a diode connected to the other secondary winding to provide for the production of a voltage of the second polarity during periods of oscillation in the oscillator and for the production of a voltage of the first polarity during periods of non-oscillation in the oscillator, a second source of triggering signals, and a network formed from a plurality of diodes and having diodes in the plurality connected to the first and second triggering sources and to the first circuit to produce a particular voltage during the period between the introduction of a triggering signal from the first source and the introduction of a signal from the second source and having an output terminal connected to the oscillator to maintain oscillations during the production of the particular voltage by the gate circuit.

4. In combination, an oscillator, means for normally biasing the oscillator to prevent oscillations, a first source for introducing a signal to the oscillator to produce oscillations, a first circuit biased to produce a voltage of a first magnitude for a condition of non-oscillation in the oscillator and coupled to the oscillator to produce a voltage of a second magnitude during periods of oscillation in the oscillator, a second circuit biased to produce a voltage of the second magnitude for a condition of non-oscillation in the oscillator and coupled to the oscillator to produce a voltage of the first magnitude during periods of oscillation in the oscillator, a second source of triggering signals, and a diode network having a pair of diodes connected in an "and" proposition to the second source and to the first output circuit and having a third diode connected to the first source in an "or" proposition with the pair of diodes to produce a particular voltage during the period between the production of triggering signals by the first and second sources, the diode network having an output terminal connected to the oscillator to maintain the production of oscillations during the period that the particular voltage is produced by the network.

5. In combination, an oscillator, means for normally biasing the oscillator to prevent oscillations, a first source for introducing a signal to the oscillator to produce oscillations, a first rectifier circuit biased to produce a first voltage during periods of non-oscillations in the oscillator and coupled to the oscillator to produce a second voltage during periods of oscillation in the oscillator, a second rectifier circuit biased to produce the second voltage during periods of non-oscillations in the oscillator and coupled to the oscillator to produce the first voltage during periods of oscillation in the oscillator, a second source, a gate circuit connected to the first source to produce a particular voltage upon the introduction of a triggering signal and connected to the first rectifier circuit and to the second source to maintain the particular voltage until the introduction of a signal from the second source, and means for introducing the voltage from the gate circuit to the oscillator to maintain the oscillations during the production of the particular voltage by the gate circuit.

6. In combination, an oscillator including a tube, means for normally biasing the oscillator tube to prevent oscillations in the tube, means for introducing a signal to the oscillator tube to produce oscillations, a first circuit coupled to the oscillator for producing a first voltage during periods of non-oscillation in the oscillator and a second voltage during periods of oscillation in the oscillator, a second circuit coupled to the oscillator for producing the second voltage during periods of non-oscillation in the oscillator and the first voltage during periods of oscillation in the oscillator, and a gate circuit coupling the first circuit to the oscillator for maintaining oscillations in the oscillator until the introduction of an external signal to the gate circuit.

7. In combination, a tube, means for normally biasing the tube to produce a first state of conductivity in the tube, means for applying a triggering signal to the tube to trigger the tube into a second state of conductivity, first output means coupled to the tube for producing a first voltage for a first state of conductivity in the tube and for producing a second voltage during the second state of conductivity in the tube, second output means coupled to the tube for producing the second voltage during the first state of conductivity in the tube and for producing the first voltage during the second state of conductivity in the tube, and a gate circuit connected to the first output means and to the tube to maintain the tube in its second state of conductivity after the application of a triggering signal and until the introduction of an external signal to the gate circuit.

8. In combination, a tube normally biased to produce a first state of conductivity in the tube and operative upon the introduction of a triggering signal to produce a second state of conductivity in the tube, a first winding connected to the tube to produce a magnetic flux in accordance with the current flowing through the tube, a second winding magnetically coupled to the first winding for maintaining a first voltage at one terminal of the second winding for a first state of conductivity in the tube and a second voltage at the terminal for a second state of conductivity in the tube, a third winding magnetically coupled to the first winding for maintaining the second voltage at one terminal of the third winding during the first state of conductivity in the tube and the first voltage at the terminal during the second state of conductivity in the tube, means for triggering the tube from its first state of conductivity to its second state of conductivity, and a gate circuit coupling the first winding to the tube to maintain the tube in its second state of conductivity until the introduction of an external signal to the gate circuit.

9. In combination, a normally open switch, means for applying a triggering signal to the switch to close the switch, a first output circuit coupled to the switch for providing a voltage of a first polarity during the opening of the switch and for providing a voltage of a second polarity upon the closure of the switch, a second output circuit coupled to the switch for providing the voltage of the second polarity during the opening of the switch and for providing the voltage of the first polarity upon the closure of the switch, a gate circuit having input terminals connected to the triggering means and to the second output circuit to produce a particular voltage upon the introduction of the triggering signal and having an output terminal connected to the switch to maintain the switch closed after the introduction of the triggering signal, and means for applying an external signal to an input terminal of the gate circuit to interrupt the particular voltage in the gate circuit for the opening of the switch.

10. In combination, a normally open switch, a first source for applying a triggering signal to the switch to close the switch, magnetic means connected to the switch for producing a magnetic flux upon the closure of the switch, a first output circuit operative upon the production of substantially no magnetic flux to produce a first voltage, and operative upon the production of the magnetic flux to produce a second voltage, a second output circuit operative upon the production of substantially no magnetic flux to produce the second voltage and operative upon the production of the magnetic flux to produce the first voltage, a second source of triggering signals, and a gate circuit having a plurality of input terminals connected to the first and second triggering sources and to the first output circuit to produce a particular voltage upon the introduction of a signal from the first source and until the introduction of a signal from the second source, the gate circuit also having an output terminal connected to the switch to open the switch upon the interruption of the particular voltage from the gate circuit.

11. In combination, a switch, means for normally maintaining the switch open, a circuit for applying a triggering signal to the switch to close the switch, a transformer having a primary winding and a pair of secondary windings, the primary winding being connected to the switch to produce a magnetic flux upon the closure of the switch, a first circuit connected to one of the secondary windings to produce an output voltage having a first magnitude upon the production of substantially no magnetic flux by the primary winding and to produce an output voltage having a second magnitude upon the production of the magnetic flux by the primary winding, a second circuit connected to the other secondary winding to produce an output voltage having the second magnitude upon the production of substantially no magnetic flux by the primary winding and to produce an output voltage having the first magnitude upon the production of the magnetic flux by the primary winding, and a gate circuit connected to the transformer and to the switch to maintain the switch closed until the introduction of an external signal to the gate circuit.

12. In combination, a tube, means for normally maintaining the tube in a first state of conductivity, means for applying a triggering signal to the tube to trigger the tube into its second state of conductivity, a first rectifier circuit including a diode biased to produce a first voltage during the first state of conductivity in the tube and coupled to the tube to produce a second voltage during the second state of conductivity in the tube, a second rectifier circuit including a diode biased to produce the second voltage during the first state of conductivity in the tube and coupled to the tube to produce the first voltage during the second state of conductivity in the tube, a second source of triggering signals, and a diode network having a pair of input terminals connected to the second rectifier circuit and the second source in an "and" proposition and to the first source in an "or" proposition with the pair of diodes to produce a particular voltage during the period between the introduction of triggering signals from the first and second sources, the gate circuit having an output terminal connected to the tube to maintain the tube in its second state of conductivity during the production of the particular voltage by the gate circuit.

13. In combination, a normally open switch, a first source for introducing a triggering signal to the switch to produce a closure of the switch, a first circuit biased to produce a first voltage during the opening of the switch and coupled to the switch to produce a second voltage during the closure of the switch, a second circuit biased to produce the second voltage during the opening of the switch and coupled to the switch to produce the first voltage during the closure of the switch, a circuit connected between the first circuit and the switch to maintain the switch closed after introduction of the triggering signal from the first source, and a second source for introducing a triggering signal to the switch to open the switch.

14. In combination, an oscillator, means for normally biasing the oscillator to prevent oscillations, a first source for applying a first triggering signal to the oscillator to produce oscillations, a first output circuit coupled to the oscillator for producing a first voltage during periods of oscillation in the oscillator and for producing a second voltage during periods of no oscillation in the oscillator, a second output circuit coupled to the oscillator for producing the second voltage during periods of oscillation in the oscillator and for producing the first voltage during periods of no oscillation in the oscillator, a circuit connected between the first output circuit and the oscillator to maintain oscillations in the oscillator after the introduction of the first triggering signal from the first source, and a second source for introducing a second triggering signal to the oscillator to stop oscillations in the oscillator.

References Cited in the file of this patent

UNITED STATES PATENTS

| | | |
|---|---|---|
| 2,447,082 | Miller | Aug. 17, 1948 |
| 2,509,792 | Westcott | May 30, 1950 |
| 2,564,687 | Guenther | Aug. 21, 1951 |